United States Patent
Banavar et al.

(10) Patent No.: US 6,952,829 B1
(45) Date of Patent: Oct. 4, 2005

(54) DYNAMICALLY ADAPTING BETWEEN PESSIMISTIC AND OPTIMISTIC NOTIFICATIONS TO REPLICATED OBJECTS

(75) Inventors: Guruduth Somasekhara Banavar, Yorktown Heights, NY (US); Kevan Lee Miller, Danbury, CT (US); Michael James Ward, New Haven, CT (US)

(73) Assignee: International Business Machines Corporation, Armonk, NY (US)

( * ) Notice: Subject to any disclaimer, the term of this patent is extended or adjusted under 35 U.S.C. 154(b) by 688 days.

(21) Appl. No.: 09/106,166

(22) Filed: Jun. 29, 1998

(51) Int. Cl.[7] .................................................. G06F 3/00
(52) U.S. Cl. ........................ 719/310; 709/224; 719/318
(58) Field of Search ................................ 709/100–108, 709/205, 310–400, 224; 707/10, 201, 8; 710/14; 719/310, 318

(56) References Cited

U.S. PATENT DOCUMENTS

| | | | | | |
|---|---|---|---|---|---|
| 5,561,797 | A | * | 10/1996 | Gilles et al. | 707/8 |
| 5,627,961 | A | * | 5/1997 | Sharman | 714/6 |
| 5,737,738 | A | * | 4/1998 | Sharman | 707/201 |
| 5,835,757 | A | * | 11/1998 | Oulid-Aissa et al. | 707/10 |
| 5,958,022 | A | * | 9/1999 | Wilhelm, Jr. | 710/14 |
| 6,006,254 | A | * | 12/1999 | Waters et al. | 709/205 |
| 6,061,683 | A | * | 5/2000 | Alonso | 707/8 |
| 6,289,396 | B1 | * | 9/2001 | Keller et al. | 709/323 |

OTHER PUBLICATIONS

Strom et al "Concurrency Control and View Notification Algorithms for Collaborative Replicated Objected," pp. 1–17, IEEE Apr. 1998.*

* cited by examiner

Primary Examiner—Meng-Al T. An
Assistant Examiner—Van Nguyen
(74) Attorney, Agent, or Firm—Douglas W. Cameron

(57) ABSTRACT

An adaptive view mechanism can dynamically adapt to changing conditions and provide the benefits of both optimistic and pessimistic notifications. This can, for example, provide a consistent and jitter-free GUI to display the state of distributed replicated data objects in the presence of concurrency control conflicts and losses. In a Model-View-Controller architecture of building distributed collaborative applications where model objects are replicated at distributed sites, adaptive views can dynamically switch between behaving like pessimistic views and like optimistic views. When the number of concurrent updates is low, the adaptive views can be made to operate in an optimistic mode—providing good responsiveness to users. However, during those periods of heavy activity, when the number of concurrent updates becomes high, the adaptive view can be made to operate in a pessimistic manner—providing more reliable response to users. For each adaptive view, a programmer can specify a policy object that can monitor the prevailing conflict rate and loss rate as if the adaptive view were behaving optimistically. Using these rates, the policy object can apply arbitrary application logic or thresholds to determine whether it is beneficial for the adaptive view to behave optimistically or pessimistically. The policy object can then request the adaptive view to dynamically adapt its behavior to the appropriate manner. In general however, the dynamic switching can be based on any application specific request to switch modes. Distributed sites that have replicated copies of the same model object can view the replica heterogeneously, that is, pessimistically, optimistically, or adaptively, according to the user's requirements.

15 Claims, 14 Drawing Sheets

DYNAMICALLY ADAPTING BETWEEN PESSIMISTIC AND OPTIMISTIC NOTIFICATIONS TO REPLICATED OBJECTS

FIELD OF THE INVENTION

The present invention relates to the responsiveness of user interfaces in distributed groupware applications. In particular the invention relates to a method for providing applications that synchronize data with other remote applications and at each site view data either pessimistically, optimistically, or adaptively by dynamically switching modes.

BACKGROUND

Synchronous distributed groupware applications are being increasingly being deployed on high-latency wide-area networks such as the Internet. For such groupware applications, the major drawback of high-latency networks is the potential decrease in responsiveness. Many synchronous groupware systems available today allow end-users to share state by making distributed copies of the shared state, and keeping the copies consistent via some consistency protocol. When a user updates his copy of the shared state, all users see the update after the consistency protocol runs and, after a certain delay, has consistently updated the replicated copies. In some groupware applications, this delay may be tolerable for users other than the one who initiates the update. However, for the initiator of the update, the delay may become intolerable, since graphical user interface (GUI) gestures will no longer provide adequate visual feedback relative to regular single-user applications.

A solution that is widely employed to solve the general problem of responsiveness in groupware is optimistic execution of updates to distributed shared state. See e.g., Schuckmann, C., Kirchner, L., Schummer, J., and Haake, J. M. (1996) "Designing Object-oriented Synchronous groupware with COAST." In Proceedings of Computer Supported Collaborative Work CSCW, 1996 ["COAST"]; and Karsenty, A. and Beaudouin-Lafon, M (1993) "An Algorithm for Distributed Groupware Applications." Proceedings of IEEE Int'l Conference on Distributed Computing Systems ICDCS '93 ["ORESTE"]. See also patent application Ser. No. 08/863,782 entitled "SYSTEM AND METHOD FOR PROVIDING COLLABORATIVE REPLICATED OBJECTS FOR SYNCHRONOUS DISTRIBUTED GROUPWARE APPLICATIONS," ["DECAF"] by Banavar et al., filed May 27, 1997 now U.S. Pat. No. 6,425,016. The present invention is commonly assigned with this patent application, which is hereby incorporated herein by reference in its entirety.

Optimistic execution is based on assumptions about the current state of the system. Subsequently, if any assumption turns out to be invalid due to concurrent operations, the conflict is resolved using any of a number of techniques: such as rollback [DECAF]; transformation (see e.g., Ellis, C. A. and Gibbs, S. J. (1989) "Concurrency Control in Groupware Systems," Proceedings of ACM Conference on the Management of Data SIGMOD '89); or masking [ORESTE]. For groupware applications where shared state is directly visible to end-users, optimistic execution does indeed increase responsiveness, since updates may be exposed to users as soon as they are optimistically applied. Thus, a system that supports optimistic execution is very useful for supporting interactive, transient state within groupware applications.

However, a groupware system that supports optimistic execution alone has limitations. For one thing, external persistent actions such as printing or saving to file should not be performed based on optimistic state. Even for interactive transient state, optimism introduces the possibility of irregular GUI behavior when optimistic assumptions turn out to be invalid, which often causes confusion to end-users. This irregular GUI behavior most commonly takes the form of lost updates (since more "recent" updates have been exposed) or jitter in an application's GUI (as updates are retried and reapplied). Thus, it is important for groupware systems to support both optimistic and some form of pessimistic execution to allow the application programmer to pick and choose what is appropriate to each case.

The aforementioned DECAF application framework for groupware supports both optimistic and pessimistic notifications of updates to distributed replicated state. DECAF extends the so called Model-View-Controller (MVC) architecture for applications. Framework provided model objects, which hold the application state, are replicatable across distributed sites, and the DECAF system automatically keeps replicas consistent with each other. Controllers, or GUI event handlers, can initiate programmer defined atomic actions on multiple model objects. Programmer defined view objects can be attached to model objects at each site to get notifications of both local and remote updates to the replicated model objects. At the time of attachment of model objects, each view object can be specified to be either optimistic or pessimistic, which determines when the system will notify the view objects. A pessimistic view is guaranteed to get all update notifications in order, and is able to take consistent snapshots of attached model objects. An optimistic view trades off complete accuracy for the performance benefit of immediately notifying updates.

In DECAF, the programmer must statically decide, per view object, whether the view object should be notified optimistically or pessimistically—this decision holds good throughout the application's life. In other words, the DECAF programmer must trade off between view responsiveness and complete view accuracy at application design time. An optimistic view's behavior is justifiable only under conditions of a low rate of concurrent updates, and thus low probability for concurrency control conflicts. Such an assumption of low conflict rate is valid for some groupware usage scenarios where, for example, users practice social protocols such as turn taking. However, if this assumption cannot be made for scenarios in which a groupware application is to be deployed, it is better to use only pessimistic views.

Observe that the rate of concurrent updates to replicated model objects, and thus the conflict rate, are inherently dynamic variables that vary within and across usage scenarios. In many scenarios, concurrent updates may be bursty by nature. Long periods of time with low rates of concurrent updates may be followed by short periods of time with high rates of concurrent updates. In these situations, programmers of systems such as must make a difficult decision between optimistic and pessimistic views.

For example, consider a hypothetical collaborative spreadsheet application used by commodity traders to aid in their analysis of a commodity market. Usually, the traders are collaborating over a low-latency LAN, analyzing different commodities in a controlled environment. These factors, which reduce the number of concurrent updates in the system, will prompt a DECAF programmer to choose optimistic views to obtain a highly responsive spreadsheet application. However, breaking news stories or market events can occasionally cause the traders to frantically focus on a small number of commodities. The result is a large number of concurrent updates, causing the spreadsheet to recalculate repeatedly. At these times, the behavior of the application is not only distracting, but also confusing to the traders. This hampers the ability of the traders to execute trades in a timely manner.

Thus a need exists for a mechanism that can dynamically adapt to changing concurrency conditions and provide the benefits of both optimistic and pessimistic notifications. The present invention meets this need.

SUMMARY

Accordingly, the present invention describes a mechanism known as adaptive views that can dynamically adapt to changing conditions and provide the benefits of both optimistic and pessimistic notifications. For example, the present invention includes features that provide a consistent and jitter-free GUI to display the state of distributed replicated data objects in the presence of concurrency control conflicts and losses.

In one embodiment, such as a Model-View-Controller architecture of building distributed collaborative applications where model objects are replicated at distributed sites, adaptive views can dynamically switch between behaving like pessimistic views and like optimistic views. When the number of concurrent updates is low, the adaptive views can be made to operate in an optimistic mode—providing good responsiveness to users. However, during those periods of heavy activity, when the number of concurrent updates becomes high, the adaptive view can be made to operate in a pessimistic manner—providing more reliable response to users.

In a system including a plurality of distributed sites, wherein each site is adapted to run at least one application and application state information is maintained at a plurality of local and remote sites, a method having features of the present invention comprises the steps of: receiving a request for an update to said state information at a local site; generating an update to the state information maintained at the local site, in response to the request for an update to the state information; generating a notification of the update to the application; and dynamically switching between an optimistic notification mode and a pessimistic notification mode.

In a preferred embodiment, for each adaptive view, a programmer can specify a policy object that can monitor the prevailing conflict rate and loss rate as if the adaptive view were behaving optimistically. Using these rates, the policy object can apply arbitrary application logic to determine whether it is beneficial for the adaptive view to behave optimistically or pessimistically. The policy object can then request the adaptive view to behave in the appropriate manner. In general however, the dynamically switching can be based on any application specific request to switch modes.

An example of a conflict rate-based method further comprises the steps of: specifying a threshold conflict rate; measuring and comparing a current conflict rate with the threshold value; and said step of dynamically switching being responsive to said comparing step. The conflict rate can be defined as a weighted function of a ratio of lost updates and aborted updates to updates initiated.

Distributed sites that have replicated copies of the same model object can advantageously view the replica heterogeneously, that is, pessimistically, optimistically, or adaptively, according to the user's requirements.

BRIEF DESCRIPTION OF THE DRAWINGS

The invention will now be described in greater detail with reference to the appended drawings wherein.

DETAILED DESCRIPTION

Figure 1A:
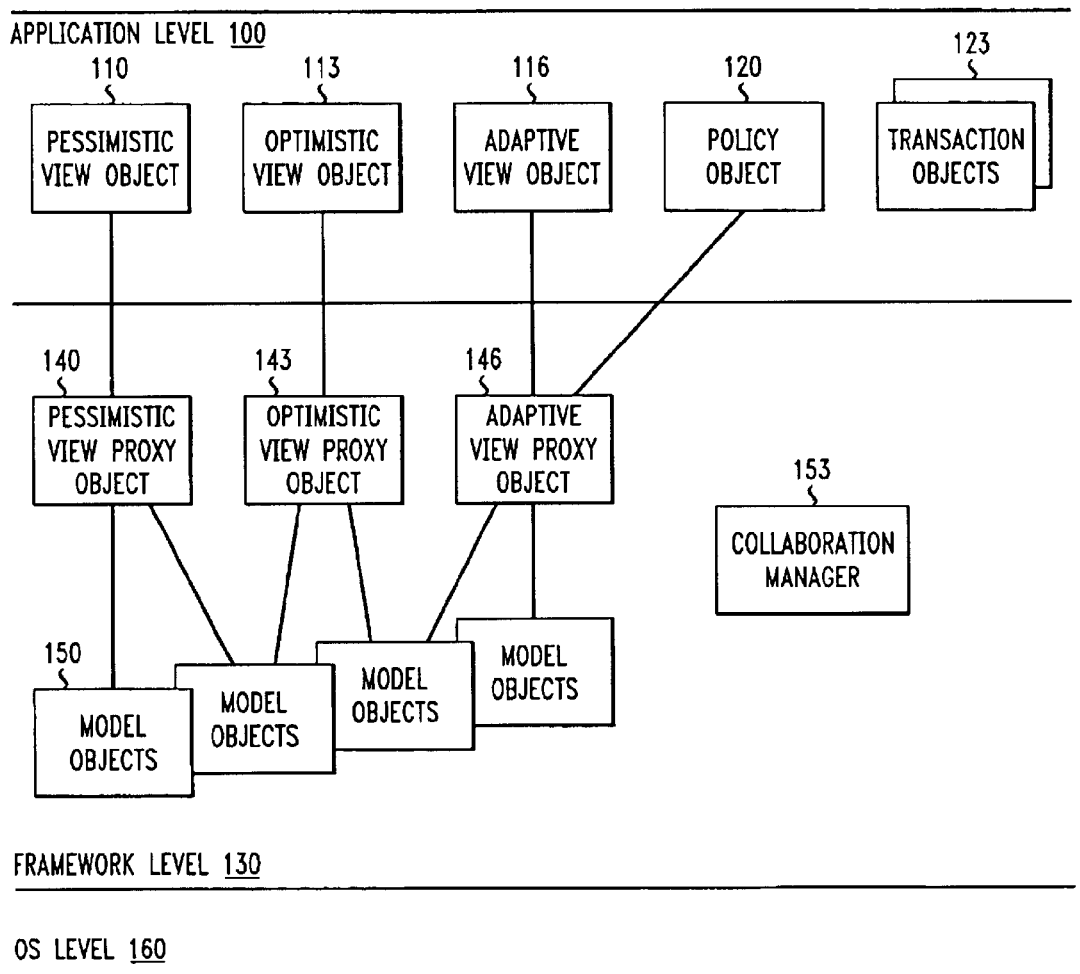
FIG. 1A provides an example of a system overview which incorporates the present invention.

FIG. 1A depicts an example of a computing device 101 (also known as a site) comprising an application level 100, a framework level 130, and an operating system (OS) level 160. The computing device is any that can be connected to a computer network, spanning the range from Internet appliances—to desktop computers—to mainframes. This invention applies to a multiplicity of such devices, interconnected by a network (not shown), for example a network based on the Internet Protocol (IP). The operating system level may be any standard operating environment, e.g., Microsoft's Windows 95™ or UNIX™.

At the application level 100, pessimistic view objects 110, optimistic view objects 113, adaptive view objects 116, policy objects 120, and transaction objects 123 are provided for the user. The three types of view objects respond to notifications that data has changed locally. The purpose of all three types of view objects is to compute some function (e.g., a graphical rendering) of some or all of the model objects 150 bound to them. The three types differ in when each receives notifications that data has changed: optimistic view objects 113 receive notifications as soon as the data has changed locally; pessimistic view objects 110 receive notifications only when the distributed sites have agreed there are no conflicts among them in the changes to the data. According to the present invention, adaptive view objects 116 may receive notifications as an optimistic view object would or a pessimistic view object would and may dynamically switch between the two notification behaviors. Policy objects monitor the conflict rates in the changes to data. When the local application responds to events initiated by the end user at that site, transaction objects 123 are created for reading and/or updating of data. The mechanism for interacting with the view objects, policy objects, and transaction objects in the application layer is a Collaboration Manager 153, which is incorporated into the framework level 130 at each site.

Figure 1B:
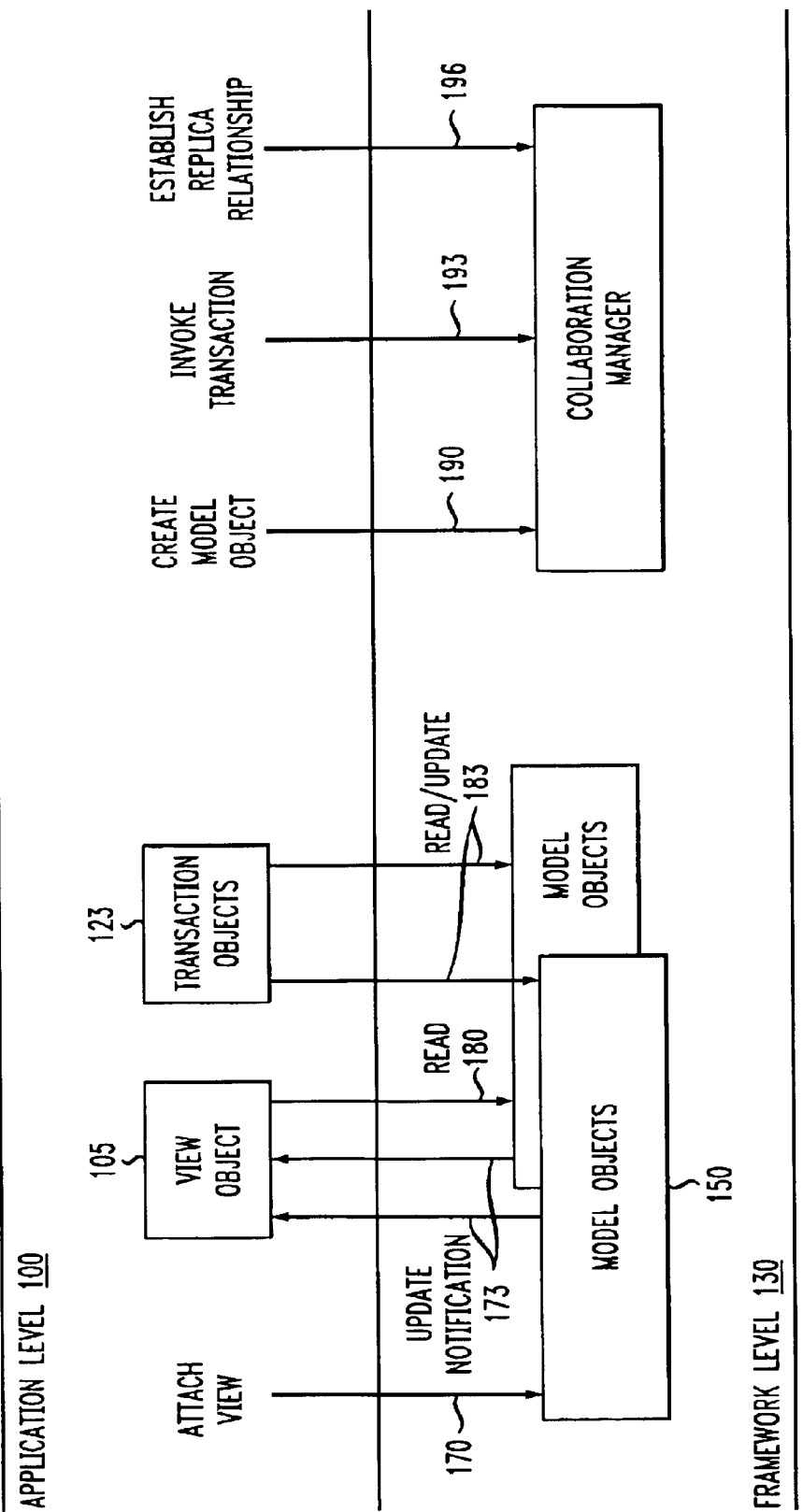
FIG. 1B depicts an example of the basic interfaces between the various components in the system.

FIG. 1B depicts an example of the interactions between the application level and the framework level. These interactions are noted below in detailing the elements of the framework level in FIG. 1A.

Referring now to FIG. 1B, the Collaboration Manager 153 serves as an object factory, creating 190 the other objects at the framework level. It establishes 196 and maintains replica relationships among local model objects and model objects at remote sites. It also serves as a message router, routing incoming messages to the appropriate object at the local site and addressing outgoing messages to appropriate objects at remote sites. Finally it controls the execution of the transaction objects (FIG. 1A, 123). The Collaboration Manager responds to requests from applications to create model object instances 190, to invoke transactions 193, and to establish replica relationships 196.

The Model objects 150 hold application state. All model objects preferably allow reading and updating of this state, as well as attaching 170 view objects 180 which receive notifications of changes to the state. Model objects 150 are preferably provided for both simple data types (e.g., integer, floating point, string) and composite objects (e.g., tables and vectors). The Model objects respond to application requests to read 180 and/or update 183 their state and to attach view objects 105. Model objects generate notifications 173 to view objects 105 when their state changes.

Referring again to FIG. 1A, the framework level 130 additionally comprises a set of pessimistic 140, optimistic 143, and adaptive 146 view proxy objects, each created by a model object in response to the first application request to attach a view object to a model object. There is one view proxy object per view object at the application level, and its type corresponds to that of the application view object. View proxy objects 140–146 are not visible to the application, as they do not directly support application requests. However, they do deliver update notifications to view objects 110–116 by creating and scheduling ViewTI objects when model objects change. As noted above for the three types of application level view objects, the corresponding types of view proxy objects differ from each other in when they deliver notifications of changes to attached model objects to their associated view objects. In doing so, the different types of view proxy objects maintain different guarantees to the application level view objects. The guarantees to pessimistic view objects are outlined below in the explanation for FIG. 6A, while those to optimistic view object in the explanation for FIG. 7A. The inventive adaptive view proxy objects provides the method, explained below in FIG. 11A, for one view object to behave like a pessimistic view at some times, like an optimistic view at others, and to dynamically switch between the two notification modes while maintaining each view's guarantees. In addition, together with the inventive policy object, the present invention describes a method in FIGS. 9B and 9C for an application to monitor the conflict rate in updates to model objects and dynamically switch between pessimistic and optimistic modes based on changes in that conflict rate.

Figure 2:
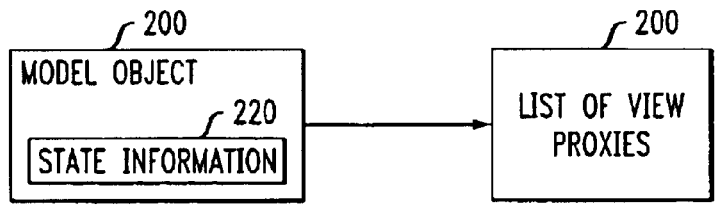
FIG. 2 depicts an example of a model object and the information maintained therein.

FIG. 2 depicts an example of a model object and the information maintained therein. As depicted, each model object 200 maintains the following information: (1) a view proxy list 210, containing references to the view proxy objects of all attached view objects; and (2) state information 220.

Figure 3:
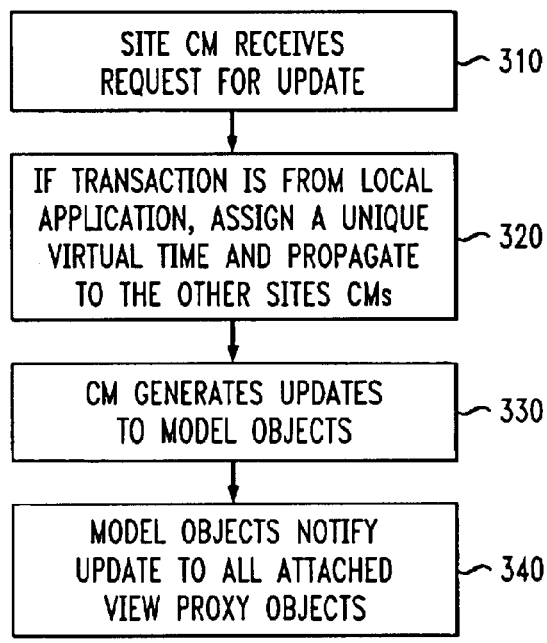
FIG. 3 depicts an example of a procedure for processing Updates to Model Objects by a Collaboration Manager.

FIG. 3 depicts an example of a procedure for processing Updates to Model Objects by a Collaboration Manager. This process has been described in the aforementioned co-pending DECAF patent application. The Collaboration Manager 153 receives a request for an update to one or more Model Objects 150, in step 310. This request for update may be created locally by a Transaction Object 123 or the request may be created by a Collaboration Manager at a remote site (not shown), and propagated to the Collaboration Manager 153 at the local site. If the updates were created locally by a Transaction Object (step 320), the Collaboration Manager assigns a unique virtual time (VT) to the updates and propagates the updates to any remote site Collaboration Managers which are sharing an updated Model Object. This VT is a global, unique time stamp which may be implemented in accordance with prior art techniques such as that proposed by Leslie Lamport (see: "Communications of the ACM", 21(7):551–565, July 1978).

The Collaboration Manager generates updates (step 330) to the model objects. When a model object is updated, the Model Object notifies (step 340) all View Proxy objects 140, 143, and 146 which have been associated with the Model Object via the AttachView 170.

Figure 4:
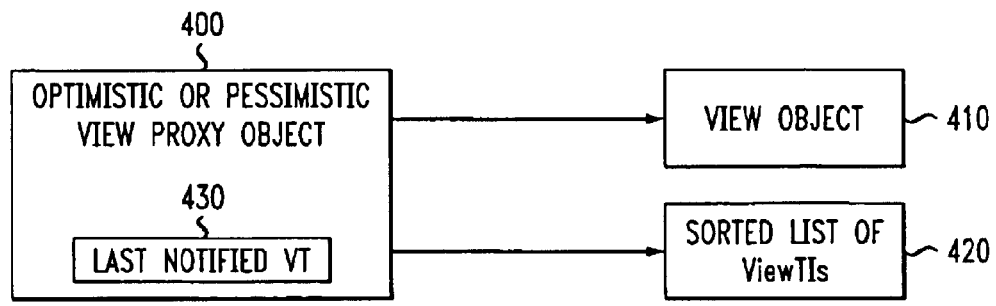
FIG. 4 depicts an example of an optimistic or a pessimistic view proxy object and the inormation maintained therein.

FIG. 4 depicts an example of an optimistic or a pessimistic view proxy object and the information maintained therein. As depicted, each optimistic or pessimistic view proxy object 400, preferably includes: (1) a reference 410 to the application level view object to be notified; (2) a list of references 420 to ViewTI objects, sorted by their virtual time (VT) field; and (3) the last notified VT 430, which is the VT of the ViewTI object for which the view proxy object last delivered an update notification to the associated application level view object.

Figure 5:
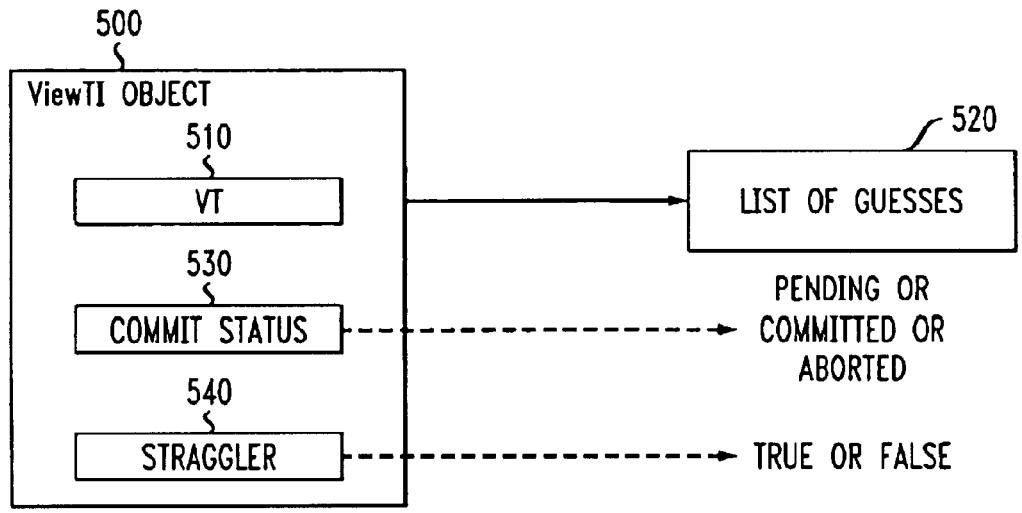
FIG. 5 depicts an example of a ViewTI object and the information maintained therein.
Figure 11A:
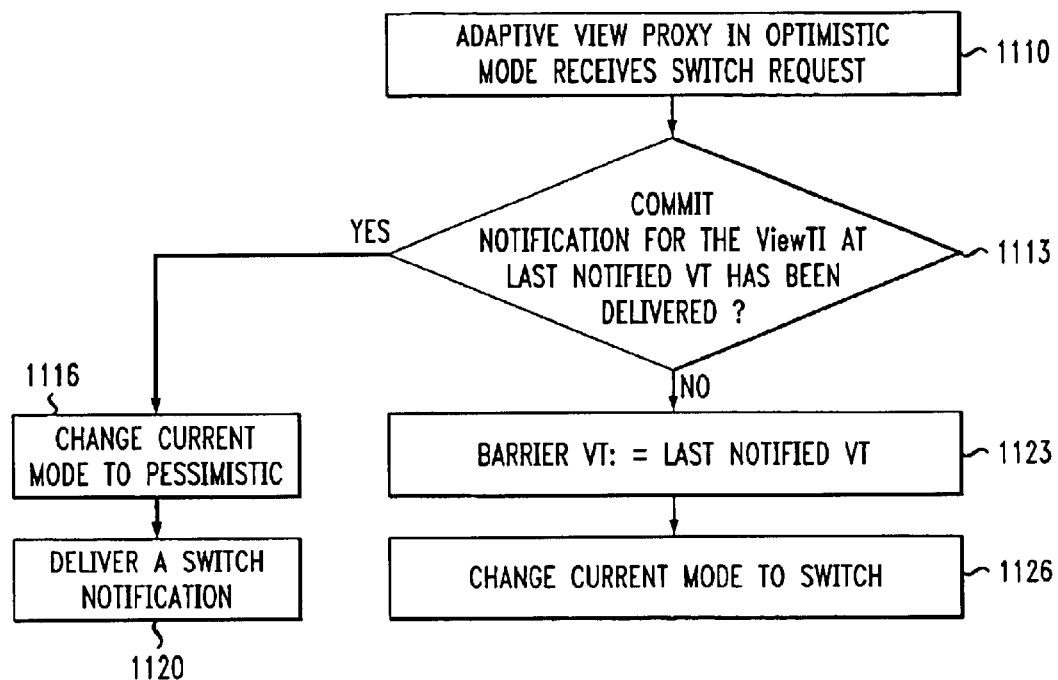
FIG. 11A depicts an example of a method for an Adaptive View Proxy Object to switch its current mode from optimistic to pessimistic mode while maintaining the optimistic and pessimistic notification gurarantees to the Adaptive View Object.
Figure 11B:
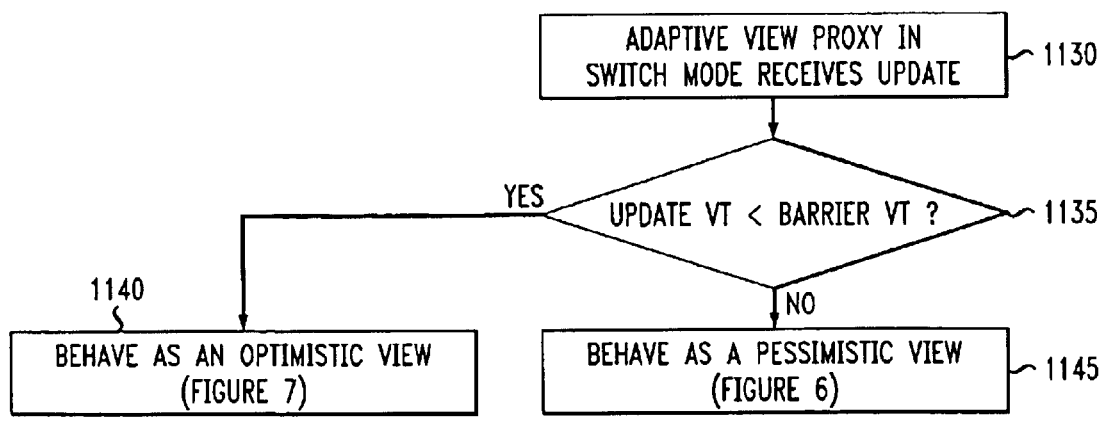
FIG. 11B depicts an example of a method for an Adaptive View proxy in SWITCH mode to process an update notification.
Figure 11C:
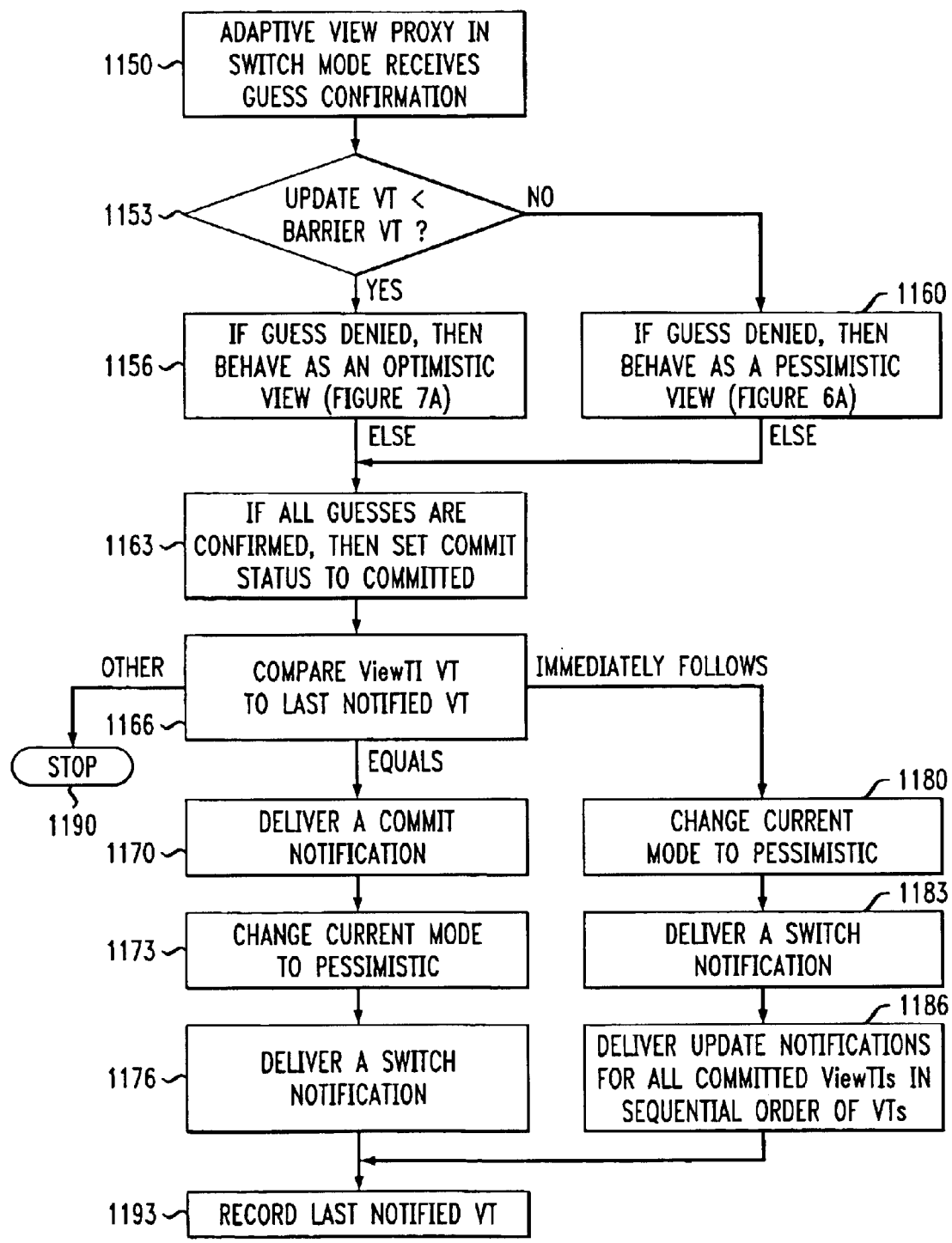
FIG. 11C depicts an example of a method for an Adaptive View proxy in SWITCH mode to process guess confirmations.

FIG. 5 depicts an example of a ViewTI object and the information maintained therein. As depicted, each ViewTI object 500 preferably includes: (1) its VT 510, which is essentially the virtual time of the transaction in response to which the view proxy object creates this ViewTI object, as described in figured FIG. 6A; (2) a list of guesses 520 which must be confirmed by the Collaboration Manager before this ViewTI object can be committed, as depicted in FIGS. 6B, 7B, and 11C; a guess is of one of a set of conditions ("guesses") associated with a particular TI such that when all its guesses are confirmed, the transaction will commit, but if one of the guesses is denied, the transaction aborts; (3) the commit status 530, which is one of PENDING, COMMITTED, or ABORTED, which is maintained as depicted in FIGS. 6A, 6B, 7A, 7B, and 11C; and (4) the straggler indicator 540, which is one of TRUE or FALSE, which indicates whether another ViewTI with a later VT was scheduled before this ViewTI and which is maintained as depicted in FIGS. 6A and 7A.

Figure 6A:
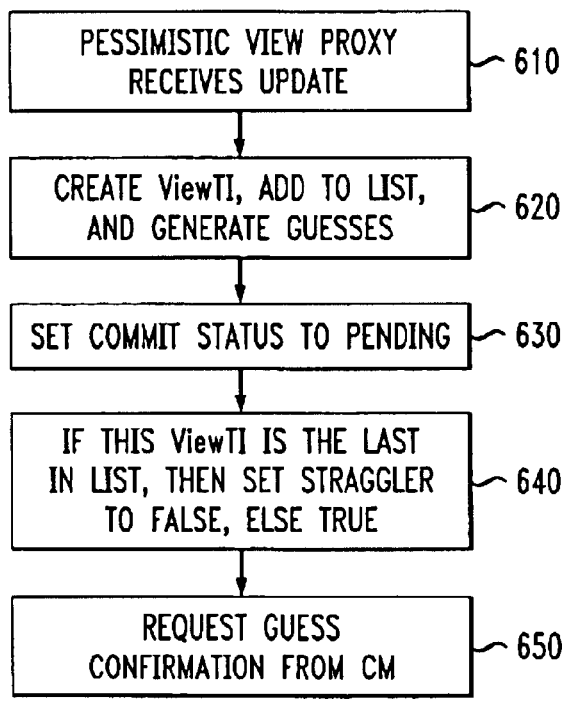
FIG. 6A depicts an example of a method for processing Model Object Update Notifications by a Pessimistic View Proxy Object.
Figure 6B:
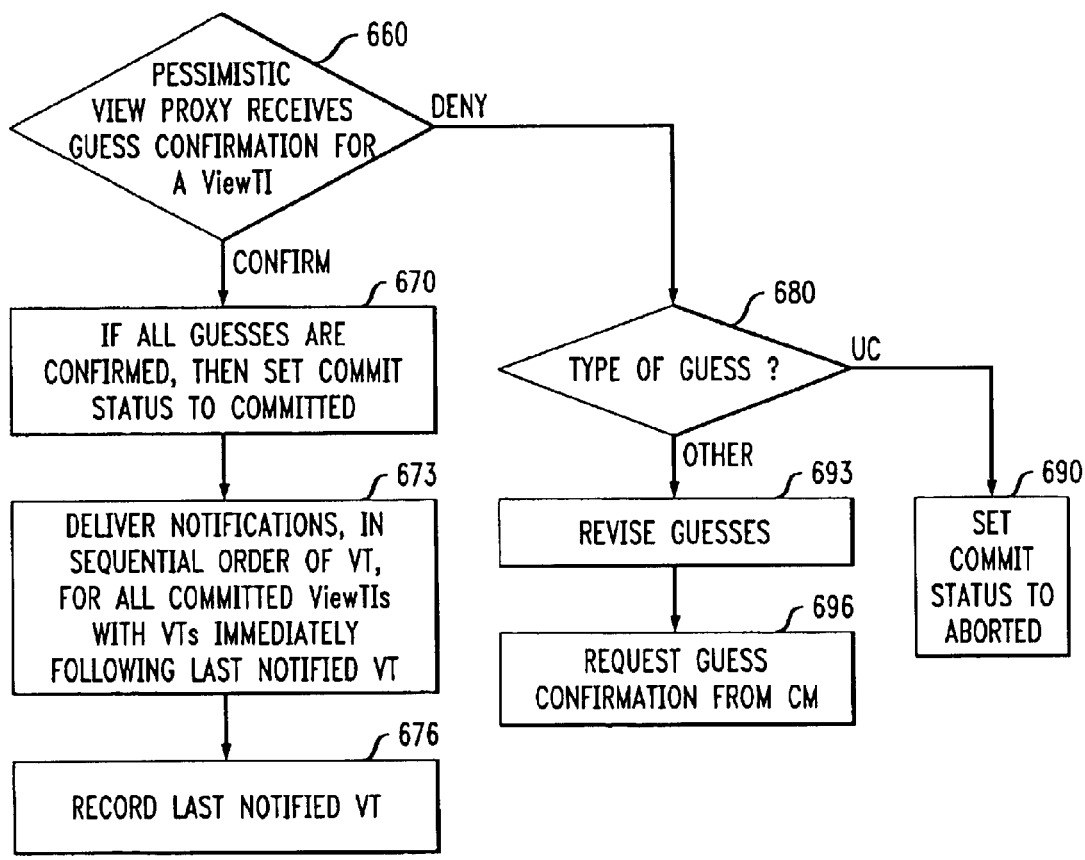
FIG. 6B depicts an example of a procedure used by a Pessimistic View Proxy Object for processing Guess Confirmations for a ViewTI.
Figure 7A:
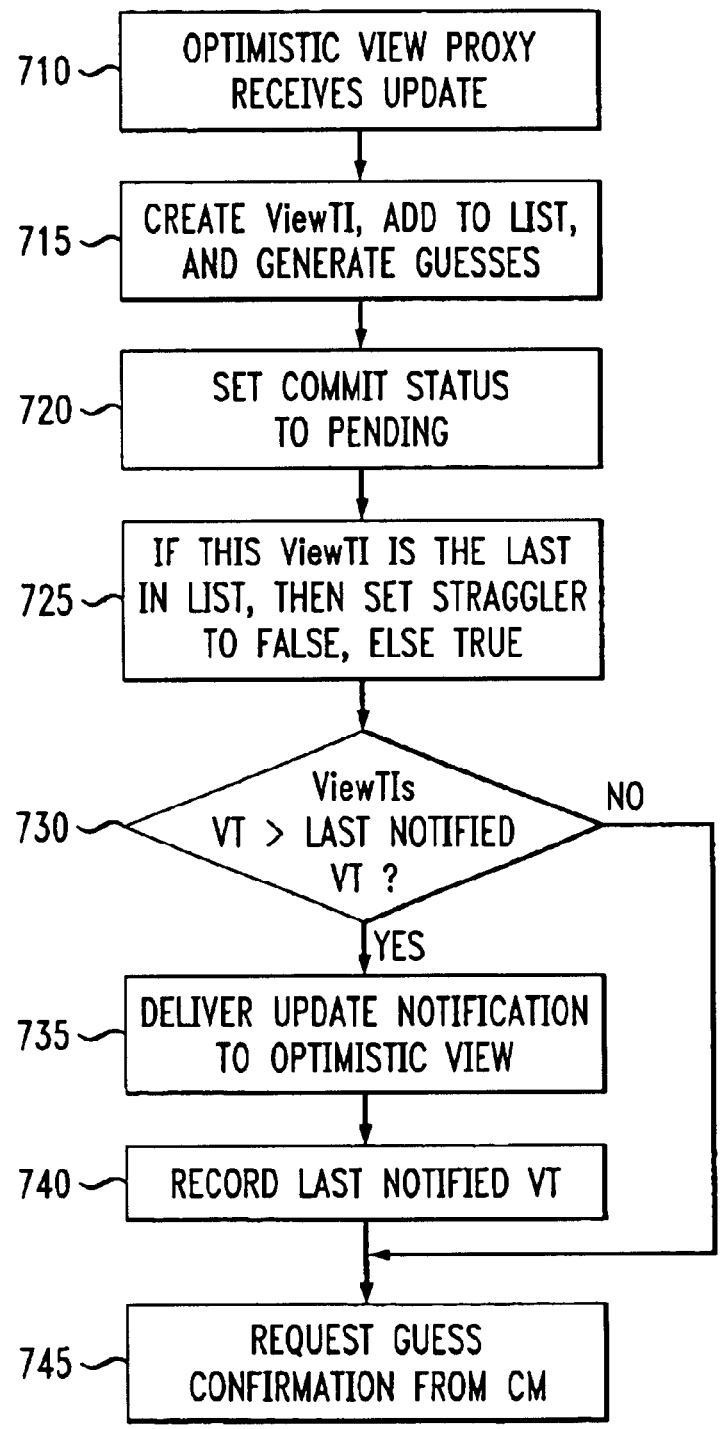
FIG. 7A depicts an example of a procedure for processing Model Object Update Notifications by an Optimistic View Proxy Object.
Figure 7B:
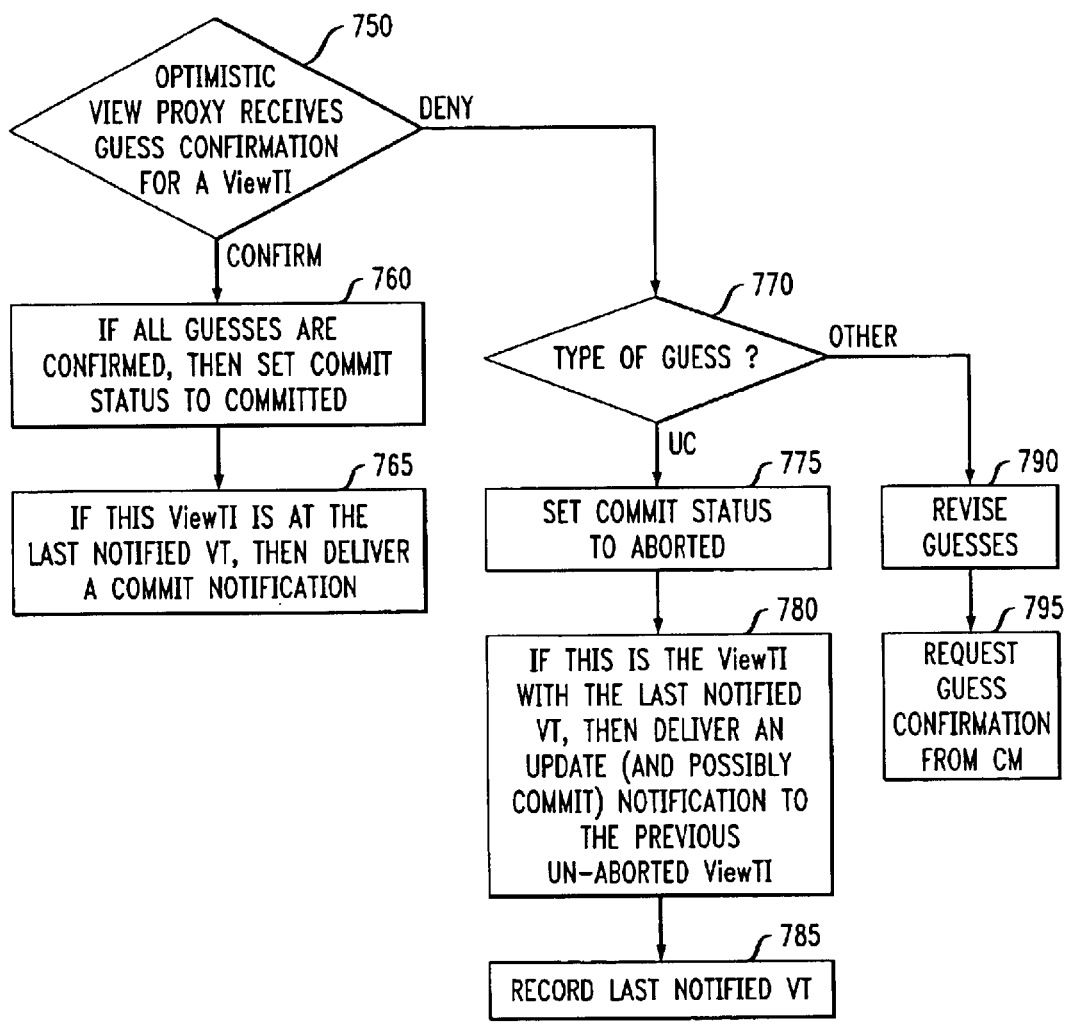
FIG. 7B depicts an example of a procedure for processing guess confirmations by an Optimistic view proxy.

FIG. 6A depicts an example of a procedure for processing Model Object Update Notifications by a Pessimistic View Proxy Object. This process has been described in the aforementioned co-pending DECAF patent application. The Pessimistic View Proxy receives update notification 610 from attached Model Objects. The Pessimistic View Proxy creates 620 a ViewTI object 500, adds the ViewTI to the sorted list of ViewTI objects, and generates a list of guesses. These guesses are described in detail in the aforementioned co-pending DECAF patent application.

The commit status field of the ViewTI is recorded as PENDING 630. If the ViewTI is the last ViewTI is the last ViewTI in the sorted list, record the straggler field as FALSE, otherwise record the straggler field as TRUE (step 640). For each guess generated in 620, the Pessimistic View Proxy requests a guess confirmation from the Collaboration Manager (step 650).

FIG. 6B depicts an example of a procedure used by a Pessimistic View Proxy Object 110 for processing Guess Confirmations for a ViewTI. In step 660, the Pessimistic View Proxy Object receives a Guess Confirmation and locates the corresponding ViewTI object in its list of ViewTI objects 660.

If the Guess Confirmation reply is a confirm and all guesses for the ViewTI have been confirmed (step 670), record the commit status in the ViewTI as COMMITTED. When all guesses are confirmed, it means that the values of all model objects at the ViewTI's VT are now consistent. In this manner, a pessimistic view is guaranteed to get a consistent state snapshot of all attached model objects upon notification. All Update notifications, which may be delivered, are now delivered to the View object (step 673). Using the sorted list of ViewTI objects, if the first ViewTI object after the last notified VT is COMMITTED, deliver an update notification to the View Object for this ViewTI. If the next ViewTI is also COMMITTED, deliver an update notification to the View Object for this ViewTI. Repeat this process until there are no more ViewTIs or the next ViewTI is not COMMITTED. In this manner, a pessimistic view is guaranteed to get notifications of all updates to attached model objects, in monotonic order of applied updates. The VT of the latest ViewTI for which an Update notification was delivered to the View object is recorded in the last notified VT field of the Pessimistic View Proxy (step 676).

If the guess confirmation was a deny, check the type of guess which has been denied (step 680). There are two types of guesses: (1) update committed (UC) guesses are confirmed if an updating transaction commits, and (2) read latest (RL) guesses are confirmed if there are no intervening updates between the ViewTI's VT and an earlier VT at which an update was made. Guesses are denied if these conditions are not satisfied. Collaboration Managers at all the collaborating sites communicate with each other to confirm or deny guess confirmation requests. If the type of guess which was denied is UC (Update Committed), the commit status of the ViewTI is recorded as ABORTED (step 690). If the type of guess which was denied is not a UC guess, the list of guesses is revised (step 693). For each revised guess, the Pessimistic View Proxy requests confirmation from the Collaboration Manager (step 696).

FIG. 7A depicts an example of a procedure for processing Model Object Update Notifications by an Optimistic View Proxy Object. This process has been described in the aforementioned co-pending DECAF patent application. As depicted, in step 710 the Optimistic View Proxy receives an update notification from an attached Model Object. The Optimistic View Proxy Object creates a ViewTI object, adds the ViewTI object to the sorted list of ViewTI objects, and generates the guesses for the ViewTI object (step 715). The commit status of the ViewTI object is recorded as PENDING (step 720). In step 725, if this ViewTI is the last in the list, record the straggler field as false; else, if this ViewTI is not the last in the list, record the straggler field as true (this means the update was a lost update—that is, it would not have been presented to an optimistic view). However, an update is lost only when a later update has already been notified, as depicted below. Regardless, check the VT of the ViewTI against the last notified VT of the Optimistic View Proxy (step 730).

If the ViewTI VT is greater than the last notified VT, deliver an update notification to the optimistic view (step 735). In this manner, an optimistic view is always notified of the latest value as soon as possible. Then, record the last notified VT field of the Optimistic View Proxy as the VT of the ViewTI (step 740). Next, in either case of the ViewTI VT greater than or less than the last notified VT check, request guess confirmation from the Collaboration Manager (step 745).

FIG. 7B depicts an example of a procedure for processing guess confirmations by an Optimistic view proxy 143. In step 750, the Optimistic View Proxy receives a guess confirmation and, using the VT of the confirmation, locates the corresponding ViewTI in the sorted list of ViewTI objects in the Optimistic View object. If the guess confirmation reply is a "confirm," check to see if all guesses for the ViewTI have been confirmed. If all guesses are not confirmed, no further processing is required. If all guesses are confirmed, record the commit status of the ViewTI as COMMITTED (step 760). If the VT of this ViewTI is the last notified VT, deliver a commit notification to the Optimistic View (step 765). In this manner, an optimistic view that was notified of a consistent update is delivered a commit notification.

If in step 750 the guess confirmation is a "deny", check the type of the guess which has been denied (step 770). If the type of the denied guess was UC, the commit status of the ViewTI is recorded as ABORTED (step 775). Next, if the VT of this ViewTI is the last notified VT (step 780), using the sorted list of ViewTI objects, locate the previous un-aborted ViewTI object and deliver an update to the Optimistic view object. In this manner, an optimistic view is given a superseding notification if an earlier update notification turned out to be inconsistent. Furthermore, if the commit status of the previous ViewTI object is COMMITTED, deliver a commit notification to the Optimistic View object. In this manner, it is guaranteed that commit notifications are always delivered in monotonic order of applied updates. Record the last notified VT of the Optimistic View Object to be the VT of the previous ViewTI object (step 785).

If the type of the denied guess was not UC, revise the list of guesses for the ViewTI (step 790). Next, request confirmation of each revised guess from the Collaboration Manager (step 795).

Figure 8A:
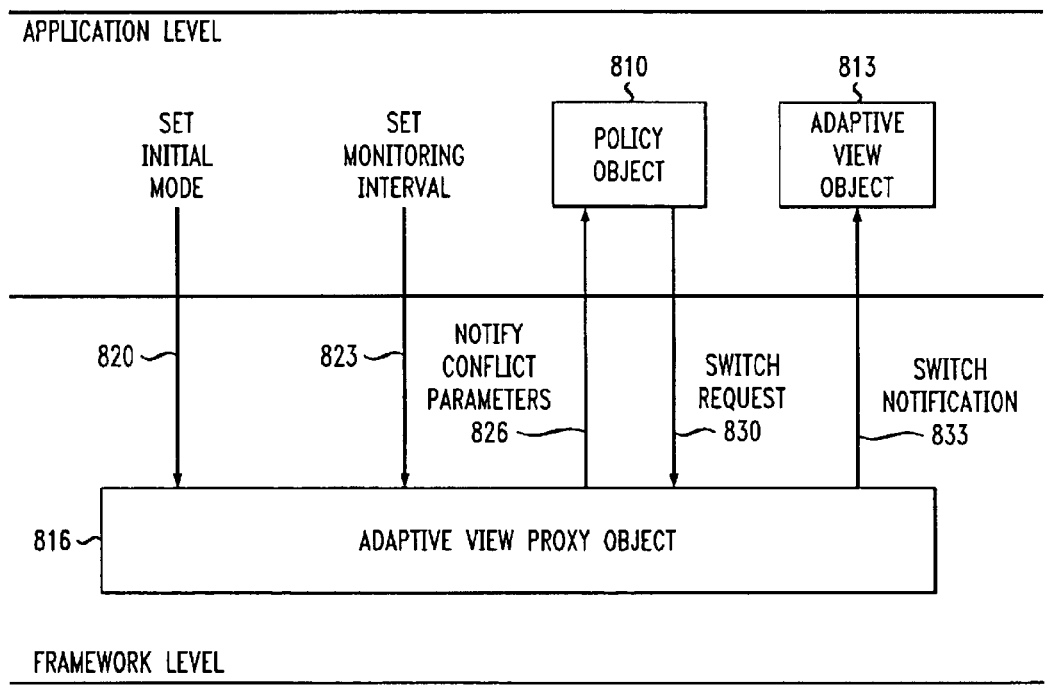
FIG. 8A depicts an example of an interface for adaptive view objects, adaptive view proxies, and policy objects.

According to the present invention, FIG. 8A depicts an example of additional interfaces among the application level 100 (policy object 810 and adaptive view object 813) and the framework level 130 (adaptive view proxy object 816) that allow an application to dynamically switch the adaptive view object between optimistic and pessimistic notification modes. As part of an application's request to attach (FIG. 1A, 170) an adaptive view object 813 to a model object 150, the application sets: an initial notification mode 820 for the adaptive view object, as either OPTIMISTIC or PESSIMISTIC; and a monitoring interval 823. The monitoring interval determines how frequently the adaptive view proxy object 816 notifies the policy object of the conflict parameters 826 (FIG. 9B depicts an example of a procedure for calculating the conflict parameters by an Adaptive View proxy). The policy object may compute an application specific conflict rate from the the conflict parameters and request the adaptive view proxy to switch notification mode 830 by the method depicted in FIG. 9C. In general, the switch request 830 can be invoked directly from an application or based on any policy. The adaptive view proxy 816 determines when the adaptive view object 813 may begin operating in the newly requested notification mode and sends a switch notification 833 to the adaptive view object 813 (an example of a method for maintaining the guarantees of the previous notification mode before switching to the new mode is depicted in FIGS. 10, 1A, 1B, and 1C).

Figure 8B:
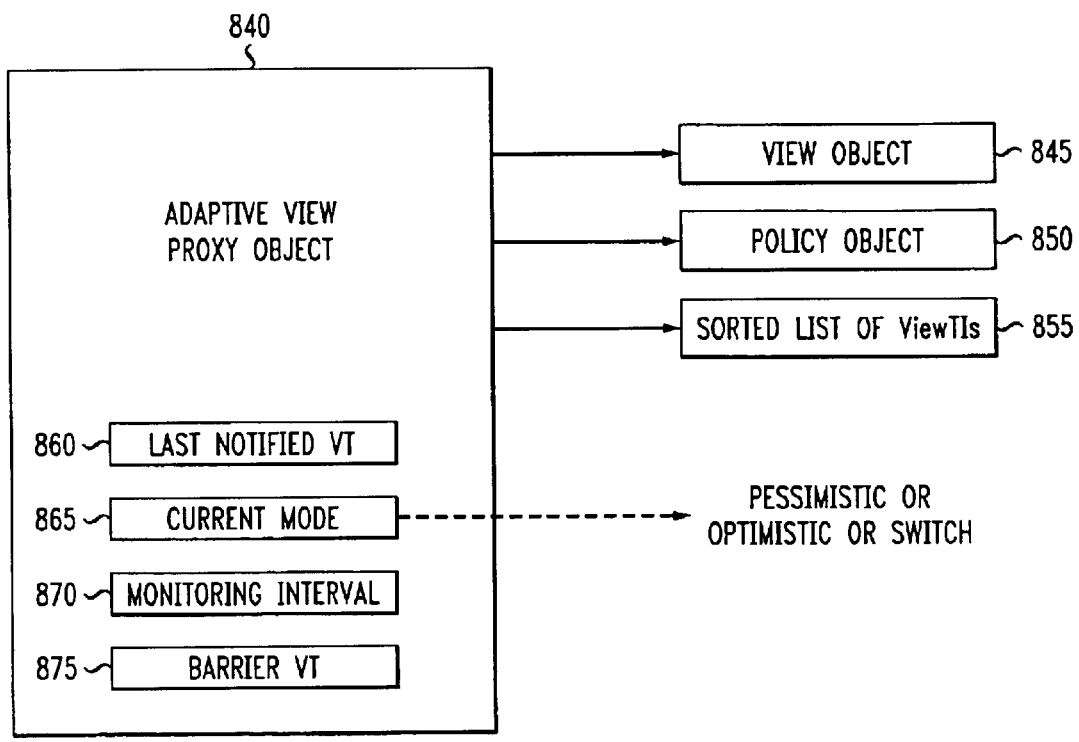
FIG. 8B depicts an example of an adaptive view proxy object and the information maintained therein.

FIG. 8B depicts an example of an adaptive view proxy object and the information maintained therein. Each adaptive view proxy object 840 includes the same information as a pessimistic or optimistic view proxy object 400: (1) a reference 845 to the application level view object to be notified; (2) a list of references 855 to ViewTI objects, sorted by their virtual time (VT) field; and (3) the last notified VT 860. It also includes the following additional information: (4) a reference 850 to the application level policy object associated with the adaptive view object; (5) the current mode 865 of notification, one of PESSIMISTIC, OPTIMISTIC, or SWITCH; (6) the barrier VT 870, used during switch from optimistic to pessimistic notification mode (as depicted in FIGS. 11A, 11B, and 11C); the monitoring interval 875, set by the application 823.

Figure 8C:
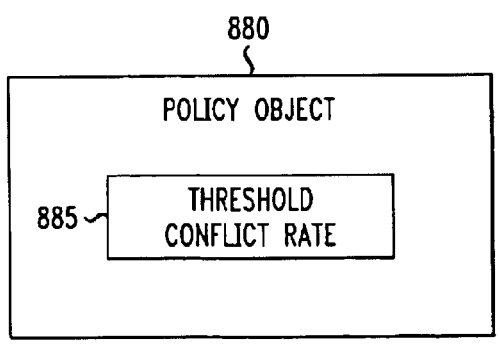
FIG. 8C depicts an example of a policy object and the information maintained therein.

FIG. 8C depicts an example of a schematic representation of a policy object and the information maintained therein. An application level 100 policy object 880 includes: (1) a threshold conflict rate 885 to determine whether to switch notification mode (an example of which will be discussed with reference to FIG. 9C.

Figure 9A:
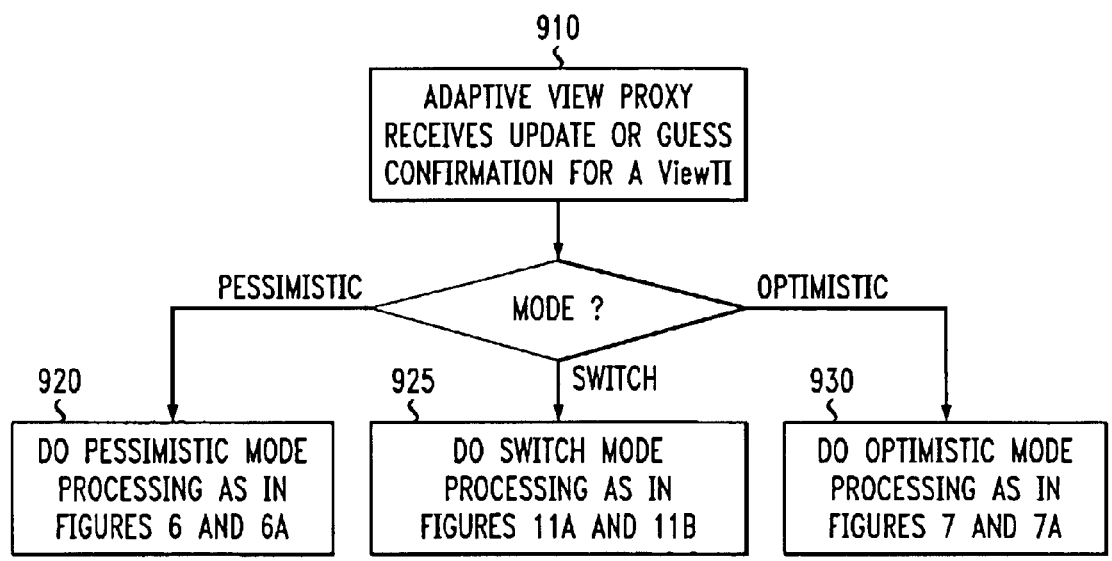
FIG. 9A depicts an example of a method for processing Model Object updates by an Adaptive View Proxy.
Figure 9B:
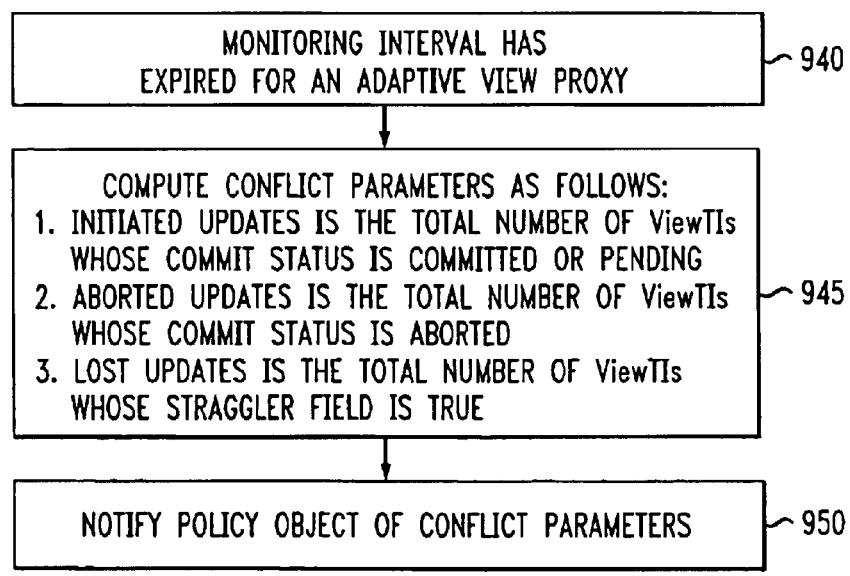
FIG. 9B depicts an example of a method for calculating the conflict parameters by an Adaptive View proxy.

FIG. 9A depicts an example of a procedure for processing Model Object updates by an Adaptive View Proxy. This procedure allows an Adaptive View to operate in optimistic mode, pessimistic mode, or switch mode. In step 910, the Adaptive View Proxy 840 receives an update notification or guess confirmation. If the current mode 850 of the Adaptive View Proxy is PESSIMISTIC (step 920), the Adaptive View Proxy follows the procedure for a Pessimistic View Proxy depicted in FIGS. 6A and 6B. If the current mode of the Adaptive View Proxy is OPTIMISTIC (step 930), the Adaptive View Proxy follows the procedure detailed in FIG. 7A and 7B. If the current mode of the Adaptive View Proxy is SWITCH (step 925), the Adaptive View Proxy follows the optimistic mode procedures depicted in FIGS. 11A, 11B, and 11C.

FIG. 9B depicts an example of a procedure for calculating the conflict parameters by the Adaptive View proxy. In step 940, a monitoring interval for an Adaptive View Proxy expires. In step 945, the conflict parameters for the Adaptive View are calculated. Using the sorted list of ViewTI objects, the Initiated Update count is set to the number of ViewTI objects whose state is COMMITTED or PENDING, the aborted updates count is set to the number of ViewTI objects whose state is ABORTED, the lost updates count is set to the number of ViewTI objects whose straggler field is TRUE. The Policy Object is notified of the conflict parameters, initiated updates, aborted updates, and lost updates (step 950).

Figure 9C:
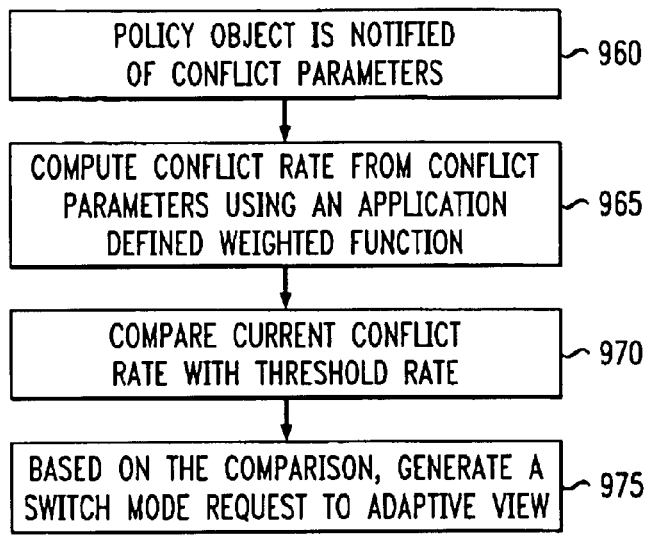
FIG. 9C depicts an example of a method for calculating the conflict rate by a Policy object using the conflict parameters.

FIG. 9C depicts an example of a procedure for calculating the conflict rate by a Policy object using the conflict parameters. In step 960, the Policy object for an Adaptive View is notified of the current conflict parameters for the Adaptive View. Using the conflict parameters, a conflict rate can be calculated using a weighted function which is defined by the application (step 965). For example, the function could be calculated by summing the aborted updates and lost update counts. This sum could then be divided by the total number of updates to yield a conflict rate for the adaptive view. For this example, each count is given the same weight. A more sophisticated application might assign different weights to the counts based on the application's characteristics; for example, if the application has low tolerance to lost updates, it would assign a higher weight to that count in calculating the conflict rate. The computed conflict rate could be compared to a threshold value (step 970) and based on this comparison a switch mode request could be sent to the adaptive view (step 975).

Figure 10:
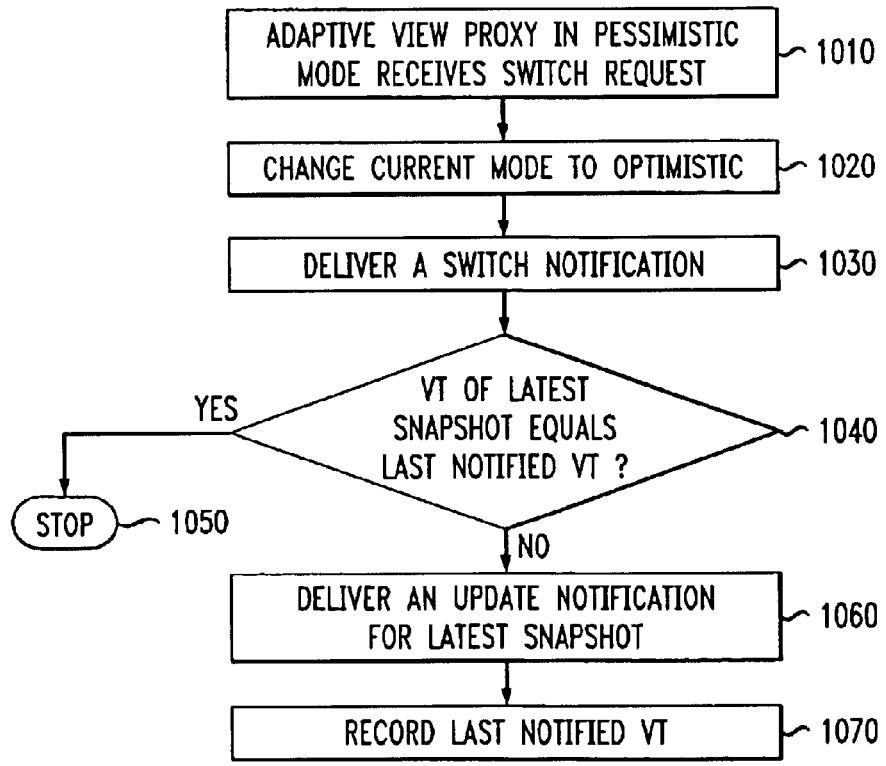
FIG. 10 depicts an example of an Adaptive View Proxy object switching its current mode from pessimistic to optimistic while maintaining the optimistic and pessimistic notification gurarantees to the Adaptive View Object.

FIG. 10 depicts an example of a procedure for an Adaptive View Proxy object switching its current mode from pessimistic to optimistic while maintaining the optimistic and pessimistic notification gurarantees. Since the guarantees provided to a pessimistic view are stronger than those provided to an optimistic view, most guarantees are automatically satisfied when switching from pessimistic to optimistic mode. The switch must ensure that the view gets notified of the latest value. In step 1010, an Adaptive View Proxy Object whose current mode is pessimistic, receives a request to switch to an optimistic mode. After setting the current mode of the Adaptive View Proxy Object to optimistic (step 1020), a switch notification is delivered to the Adaptive View (step 1030). The VT of the latest ViewTI is compared to the last notified VT field of the Adaptive View Object (step 1040). If the ViewTI VT equals the last notified VT, there is nothing more to do (step 1050). The Adaptive View has been informed of the latest known update. If the ViewTI VT is not equal to the last notified VT, the Adaptive View Object has not been informed of the latest update. Therefore, an update notification is delivered to the Adaptive View Object (step 1060) and the last notified VT field of the Adaptive View Proxy is set to the VT of the latest ViewTI VT (step 1070). In this manner, the latest known update is always notified to an adaptive view in the optimistic mode.

FIG. 11A depicts an example of a procedure for an Adaptive View Proxy Object to switch its current mode from optimistic to pessimistic mode while maintaining the optimistic and pessimistic notification gurarantees to the Adaptive View Object. In step 1110, an Adaptive View Proxy Object with current mode equal to optimistic receives a request to switch from optimistic mode to pessimistic mode. The Adaptive View Proxy locates the ViewTI whose VT is equal to the VT of the last notified VT and checks to see if the commit status is committed (step 1113). If the commit status is committed, the current mode of the Adaptive View Proxy Object is set to pessimistic (step 1116) and a switch notification is delivered to the Adaptive View Object (step 1120).

If the ViewTI at the last notified VT is not committed, the barrierVT field of the Adaptive View Proxy is set to the last notified VT value (step 1123). This barrierVT defines a point in virtual time after which the Adaptive View Proxy will behave in a pessimistic fashion and prior to which the Adaptive View will behave in an optimistic fashion. In other words, the stronger guarantees of a pessimistic view, such as monotonicity and losslessness of updates, are ensured after the BarrierVT. The current mode of the Adaptive View Proxy is then set to SWITCH (step 1126).

FIG. 11B depicts an example of a procedure for an Adaptive View proxy in SWITCH mode to process an update notification. In step 1130, an Adaptive View proxy whose current mode is SWITCH receives an update notification and compares the VT of the update notification to the barrier VT field (step 1135). If the VT of the Update is less than the barrier VT, the adaptive view follows the processing for an optimistic view (step 1140) (for example as depicted in FIG. 7A). If the VT of the Update Notification is not less than the barrier VT, the adaptive view follows the processing for a pessimistic view (step 1145) (for example as depicted in FIG. 6A).

FIG. 11C depicts an example of a procedure for an Adaptive View proxy in SWITCH mode to process guess confirmations. In step 1150, an Adaptive View proxy in SWITCH mode receives a guess confirmation. The VT of the update is compared to the barrier VT of the Adaptive View proxy (step 1153).

If the update VT is less than the barrier VT and the guess confirmation is a guess denied (step 1156), perform processing for an optimistic view (for example as depicted in FIG. 7B. If the update VT is not less than the barrier VT and the guess confirmation is a guess denied (step 1160), perform processing for a pessimistic view (for example as depicted in FIG. 6B).

In either case, if the guess was not denied and all guesses for the ViewTI corresponding to the update VT have been confirmed, set the commit status of the ViewTI to COMMITTED (step 1163). In this manner, the system guarantees that, the pessimistic view gets a notification of a consistent snapshot of attached model objects. Note that if all guesses are not confirmed, no further processing is required.

Next, the ViewTI VT is compared to the last notified VT of the Adaptive View proxy (step 1166). If the ViewTI VT equals the last notified VT, a commit notification is delivered to the Adaptive View (step 1170), the current mode is recorded as PESSIMISTIC (step 1173), and a switch notification is delivered to the Adaptive View (step 1176).

If the ViewTI VT immediately follows the last notified VT, the current mode is recorded as PESSIMISTIC (step 1180), a switch notification is delivered to the Adaptive View (step 1183), and all update notifications for committed ViewTIs which can be delivered are delivered to the Adaptive View, in sequential order of VTs (step 1186). In this manner, the monotonicity and losslessness guarantees are maintained. This process is identical to the process for step 673 in FIG. 6B.

If the ViewTI does not equal and does not immediately follow the last notified VT, no further processing is required (step 1190).

Next, in either case when the ViewTI equals or immediately follows the last notified VT, the VT of the latest ViewTI is recorded as the last notified VT field in the Adaptive View proxy (step 1193).

Figure 12:
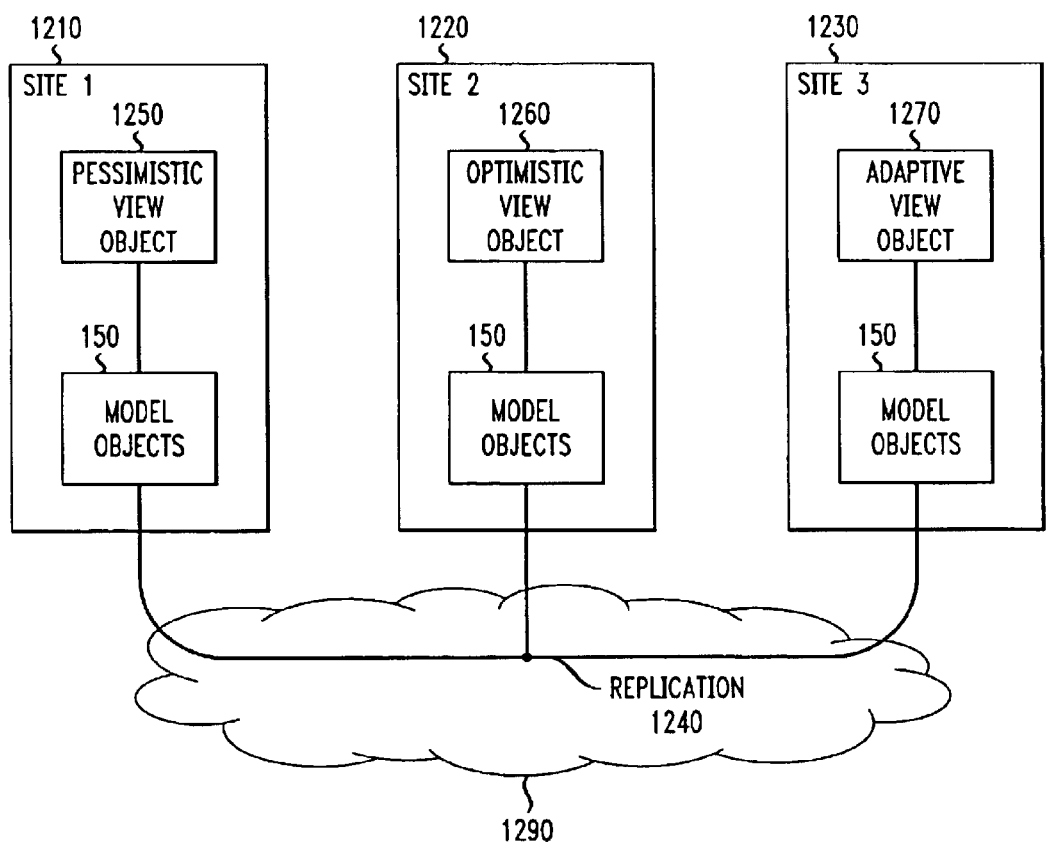
FIG. 12 depicts an example of a distributed replicas of the same model objects using heterogeneous types of views.

FIG. 12 depicts an example of a set of three computing devices having features of the present invention coupled by a network 1290 such as the Internet. The Collaboration Managers 153 at each site have established a replica relationship 1240 among the model objects 150 at their sites 1210, 1220, and 1230. According to the present invention, applications at different sites may attach different types of view objects (pessimistic view object 1250, optimistic view object 1260, and adaptive view object 1270) to their local model objects. This permits sites with different characteristic, e.g., low processing power or a high bandwidth network connection, to choose the type of view object that best fits those characteristics.

A preferred embodiment of the present invention includes features implemented as software tangibly embodied on a computer program product or program storage device for execution on a processor (not shown) provided with the computing devices 101, 1210, 1220 and 1230. For example, software implemented in a popular object-oriented computer executable code such as JAVA provides portability across different platforms. Those skilled in the art will appreciate that other procedure-oriented and object-oriented (OO) programming environments, such as $C^{++}$ and Smalltalk can also be employed.

Those skilled in the art will also appreciate that methods of the present invention may be implemented as software for execution on a computer or other processor-based device. The software may be embodied on a magnetic, electrical, optical, or other persistent program and/or data storage device, including but not limited to: magnetic disks; DASD; bubble memory; tape; optical disks such as CD-ROMs; and other persistent (also called nonvolatile) storage devices such as core, ROM, PROM, flash memory, or battery backed RAM. Those skilled in the art will appreciate that within the spirit and scope of the present invention, one or more of the components instantiated in the memory of the computing devices 101, 1210, 1220 and 1230 could be accessed and maintained directly via disk (not shown), the network 1290, another site, or could be distributed or replicated across a plurality of sites.

The invention, as it has been depicted by way of the preferred embodiment, provides the user with a collaboration system in which changes are propagated automatically and consistently in an adaptive manner. One having skill in the relevant art will recognize that equivalents, modifications and improvements may be made without departing from the spirit and scope of the invention as set forth in the appended claims.

We claim:

1. In a system including a plurality of distributed sites, wherein each site is adapted to run at least one application and application state information is maintained at a plurality of local and remote sites, a method comprising the steps of:

receiving a request for an update to said state information at a local site;

generating an update to said state information maintained at said local site, in response to said request for an update to the state information;

generating a notification of said update to said application;

dynamically switching between an optimistic notification mode and a pessimistic notification mode; and monitoring a conflict rate for said updates to said state information; wherein said step of dynamically switching is based on said conflict rate.

2. The method of claim 1, further comprising the step of:

measuring a deviation of the conflict rate for said optimistic notification mode from a conflict rate associated with said pessimistic notification mode; wherein said step of dynamically switching is responsive to said deviation.

3. The method of claim 1, further comprising the step of:

adjusting the frequency of said monitoring of said conflict rate.

4. The method of claim 1, wherein said distributed sites support heterogeneous notification modes.

5. The method of claim 1, said step of dynamically switching further comprising the step of:

maintaining optimistic notification guarantees and pessimistic notification guarantees during a switch there between.

6. The method of claim 1, wherein said step of dynamically switching further comprises the step of generating a transition notification associated with a transition between said optimistic notification mode and said pessimistic notification mode.

7. The method of claim 1, where an adaptive view in said pessimistic notification mode is guaranteed to:

get a consistent state snapshot of attached model objects, get notifications in monotonic order of applied updates, and get notifications of all updates to attached model objects.

8. The method of claim 1, where an adaptive view in said optimistic notification mode is guaranteed to:

get a superseding update notification if the state snapshot of model objects is not consistent, get a commit notification for every consistent update notification, get commit notifications in monotonic order of applied updates, never lose an update unless it is superseded by a subsequent update, and get notified of the latest value of attached model objects as soon as possible.

9. The method of claim 1, wherein said step of dynamically switching further comprises the step of dynamically switching based on a request to switch modes from said application.

10. In a system including a plurality of distributed sites, wherein each site is adapted to run at least one application and application state information is maintained at a plurality of local and remote sites, a method comprising the steps of:

receiving a request for an update to said state information at a local site;

generating an update to said state information maintained at said local site, in response to said request for an update to the state information;

generating a notification of said update to said application;

dynamically switching between an optimistic notification mode and a pessimistic notification mode;

specifying a threshold conflict rate; and measuring and comparing a current conflict rate with the threshold value; and said step of dynamically switching being responsive to said comparing step.

11. The method of claim 10, further comprising the step of:

defining the conflict rate as a weighted function of a ratio of lost updates and aborted updates to updates initiated.

12. In a system including a plurality of distributed sites, wherein each site is adapted to run at least one application and application state information is maintained at a plurality of local and remote sites, a method comprising the steps of:

receiving a request for an update to said state information at a local site;

generating an update to said state information maintained at said local site, in response to said request for an update to the state information;

generating a notification of said update to said application; and dynamically switching between an optimistic notification mode and a pessimistic notification mode;

wherein each site includes an object-oriented system wherein said application state information comprises model objects said model objects adapted for reading, updating, attaching a view object and establishing and terminating replica relationships with other model objects, said method further comprising the steps of:

attaching adaptive view objects to said model objects;

controller objects initiating atomic transactions on multiple model objects; and attaching at least one adaptive view object to one or more of said model objects at each site, said adaptive view objects adapted to track updates to attached model objects; wherein said adaptive view object supports both an optimistic notification mode and a pessimistic notification mode.

13. The method of claim 12, further comprising the step of requesting said adaptive view object to switch from said optimistic notification mode to said pessimistic notification mode or vice versa.

14. The method of claim 12, further comprising the step of associating a policy object with said adaptive view object in order to receive notifications of aborted updates and lost updates.

15. The method of claim 12, wherein the object-oriented system includes one or more transaction objects for updating one or more of said model objects at an originating site, further comprising the steps of:

in response to a request for an update, assigning to a transaction object a unique virtual time for said request;

said transaction object invoking said at least one application for executing said request; and said transaction object notifying one of said plurality of remote model objects maintaining said shared computer information of said execution.

* * * * *